Aug. 26, 1958 E. J. J. JONSSON 2,848,940
BALE PRESSES FOR PAPER, RAGS, STRAW, PEAT AND THE LIKE
Filed July 26, 1956
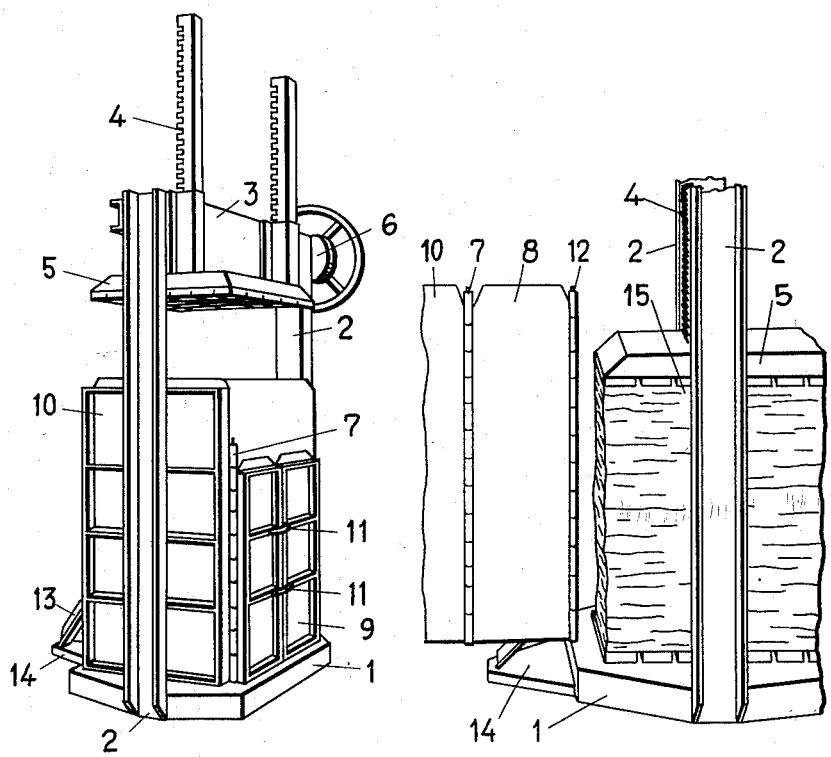
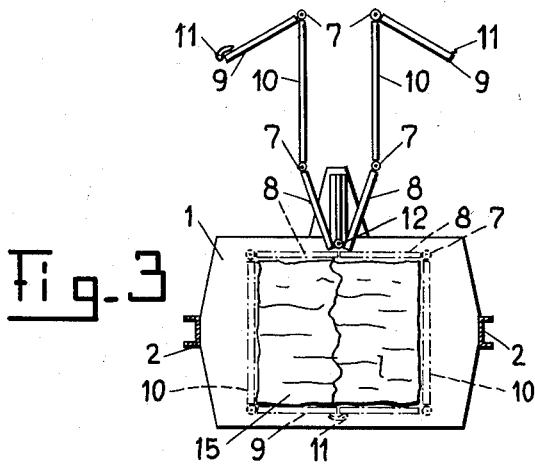
Inventor
E. Jonsson United States Patent Office 2,848,940
Patented Aug. 26, 1958

2,848,940

BALE PRESSES FOR PAPER, RAGS, STRAW, PEAT AND THE LIKE

Einar Julius Jakob Jonsson, Stockholm, Sweden

Application July 26, 1956, Serial No. 600,289

Claims priority, application Sweden August 18, 1955

1 Claim. (Cl. 100—255)

This invention relates to a device in bale presses and has for its object to facilitate the packing of pressed bales.

In one type of bale press the material is fed down from above into a container of parallelepipedic form, and a press piston is adapted to compress the material vertically into a bale. To facilitate the packing of the bale, which work should preferably be effected with the bale still under the pressure of the piston, one wall of the container is usually hinged either to the lower portion of the press frame or to an adjacent portion of the container. Since the other three walls of the container are pressing against the material, it has proved rather difficult to pack a bale, as bands, cables or the like must be laid around the bale while it is subjected to the pressure of the piston. It has been suggested to eliminate this drawback by providing means for pulling the container away from the bale on a carriage. However, this construction is beset with the main drawback that the carriage needs much space and besides this construction is very expensive to manufacture.

In another type of bale press the container consists of sides fastened by means of hinges or the like. These sides can be swung away from a bale formed in the press, so that the vertical sides of the bale are laid free. In principle, this construction is often well suited, as it highly facilitates the packing. However, the constructions of this type hitherto known suffer from several drawbacks, mainly because the sides cannot be swung sufficiently far away from the bale and will thus form an obstacle for the person packing the bale.

This invention eliminates the above drawback by providing sides which can be swung away from the bale in such a way that they do not hinder the packing procedure.

According to this invention, the bale press consists of a horizontal foundation having on its upper side a vertically standing parallel epipedic container. Two mutually parallel uprights are rigidly fastened to the foundation on opposite sides of the latter. The upper ends of the uprights are rigidly secured to a horizontal beam, which also serves as support for piston rods and a press piston with attached operating means. The container consists of sides, which are adapted to be swung away from a bale formed in the container so as to leave the vertical bale sides completely free. To this end all sides are fastened to each other by hinges or the like, which are secured at the vertical edges of the sides, one of the hinges having its lower end mounted to the foundation and its upper end mounted to a supporting arm, which is rigidly secured to the foundation. Through this arrangement all the sides can be swung about the hinge that is mounted at both ends.

An embodiment of the invention is described in the following text, reference being had to the accompanying drawing, in which Fig. 1 is a perspective view of the press with the sides coupled together to form a container which is open at the top, Fig. 2 is a perspective view of the press with the sides swung away from the bale so as to leave the bale sides free, Fig. 3 is a diagrammatical top plan view of the press, illustrating how the sides are assembled, and their function.

Referring now to the drawing, the numeral 1 designates a foundation, to which the lower ends of two uprights 2 are fastened. A horizontal beam 3 connects the upper ends of the uprights 2 and serves as support for two piston rods 4, a press piston 5 and an operating means 6 for the latter. The container consists of six rectangular steel side plates interconnected at their vertical sides by means of hinges 7 or the like. Two side plates 8 form the rear wall of the container, and two somewhat shorter side plates 9 form its front wall. Each one of the two remaining container walls consist of a side plate 10 located between a rear side plate 8 and a front side plate 9. In this way all the sides are coupled together into one unit. The two front side plates 9 are not hinged to each other, but are provided on their outside with coupling means 11 such as an eccentric lock or the like, by which they can be interlocked on a line with each other. The two rear side plates 8 are interconnected by means of a hinge 12 provided on their outer sides. The lower end of hinge 12 is mounted to the foundation 1 and its upper end to the upper end of an obliquely extending supporting arm 13, whose lower end is rigidly connected to a bracket 14 that is secured to or embedded in the foundation 1. When the front side plates 9 are locked together, the container is ready to receive the material 15 from which the bale should be made. When the pressing of the bale is finished, the two front lids 9 are released from each other and all the side plates pushed rearwards on either side of the bale. The uprights 2 are so widely spaced from the bale that the side plates can easily pass through the interspace. Since the hinge 12 is mounted on the outside of the side plates 8, the vertical sides of the bale will be left completely free when the sides are swung rearwards as shown in Fig. 2. Thus the bale can be packed while under the pressure from the piston 5 without the container hindering the work. This means that the work becomes much easier, and also that much packing material such as sack drill or the like is saved, as it is possible to check that the bale is completely covered with the least possible amount of wrapping material. When the bale is ready and removed from the press it is very easy to swing the sides into closed position and interlock them so as to form the container.

It should be understood that the invention is not confined to the embodiment described above and illustrated on the drawing but can be modified several ways without abandonment of the inventional spirit.

I claim:

A bale press for paper, rags, peat and the like of the type comprising a horizontal foundation, a parallelepipedic container provided on the upper side of said foundation, and two mutually parallel uprights having their lower ends secured on opposite sides of said foundation at a distance from said container and their upper ends interconnected by a horizontal beam supporting piston rods and a piston with attached operating means, the walls of said container consisting of side plates, each of which is connected to at least one adjacent side plate by means of hinges provided at the vertical edges of said side plates, one of said hinges having its lower end secured to said foundation and its upper end secured to a supporting arm that is rigidly connected to said foundation, all to the effect that said side plates are swingable about said last-mentioned hinge, the rear wall of said container consisting of two side plates, the front wall of two other side plates, and each of the two side walls consisting of one plate, said front wall plates being provided with interlocking means by which these plates can be coupled together on a line with one another, and said two rear wall plates being interconnected by the hinge that is secured to the foundation and the supporting arm.

References Cited in the file of this patent

UNITED STATES PATENTS

| | | |
|---|---|---|
| 291,683 | Chapman | Jan. 8, 1884 |
| 1,296,830 | Marsh | Mar. 11, 1919 |
| 1,515,318 | Tennebaum | Nov. 11, 1924 |
| 2,330,165 | Wykes | Sept. 21, 1943 |

FOREIGN PATENTS

| | | |
|---|---|---|
| 381,181 | France | Oct. 31, 1907 |
| 546,894 | France | Sept. 5, 1922 |
| 685,520 | Germany | Dec. 19, 1939 |